United States Patent
Jeong

(10) Patent No.: US 12,466,247 B2
(45) Date of Patent: Nov. 11, 2025

(54) APPARATUS AND METHOD FOR AUTOMATIC ASSEMBLY OF WEATHER STRIP

(71) Applicants: Hyundai Motor Company, Seoul (KR); Kia Corporation, Seoul (KR)

(72) Inventor: Dong Ha Jeong, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/838,050

(22) PCT Filed: Dec. 20, 2022

(86) PCT No.: PCT/KR2022/020785
§ 371 (c)(1),
(2) Date: Feb. 7, 2025

(87) PCT Pub. No.: WO2023/171893
PCT Pub. Date: Sep. 14, 2023

(65) Prior Publication Data
US 2025/0162392 A1  May 22, 2025

(30) Foreign Application Priority Data
Mar. 7, 2022 (KR) ............ 10-2022-0028479

(51) Int. Cl.
*B23P 19/04* (2006.01)
*B60J 10/00* (2016.01)

(52) U.S. Cl.
CPC ............. *B60J 10/45* (2016.02); *B23P 19/04* (2013.01)

(58) Field of Classification Search
CPC ... B60J 10/45; B60J 10/21; B60J 10/84; B60J 10/00; B23P 19/04; B25J 9/16; B25J 9/162; B25J 9/1669; B25J 9/1694; B25J 19/04; B25J 19/02; B25J 19/022; B25J 19/023; B25J 15/00; B25J 15/0066; B62D 65/028;
(Continued)

(56) References Cited

U.S. PATENT DOCUMENTS

| | | | | |
|---|---|---|---|---|
| 4,715,110 A | * | 12/1987 | St. Angelo | B23P 19/047 29/235 |
| 11,313,184 B2 | * | 4/2022 | Søyland | E21B 19/168 |
| 2019/0092152 A1 | * | 3/2019 | Lee | B23P 19/047 |

FOREIGN PATENT DOCUMENTS

| | | | |
|---|---|---|---|
| JP | 5-104357 A | | 4/1993 |
| JP | H05104357 A | * | 4/1993 |
| JP | 8-174353 A | | 7/1996 |

(Continued)

OTHER PUBLICATIONS

International Search Report (with partial translation) and Written Opinion issued in corresponding International Patent Application No. PCT/KR2022/020785, dated Mar. 22, 2023.

*Primary Examiner* — Bayan Salone
(74) *Attorney, Agent, or Firm* — Morgan, Lewis & Bockius LLP

(57) ABSTRACT

Proposed are an apparatus and a method for automatic assembly of a weather strip, wherein both the work of fitting a weather strip (20) to a chassis flange (10) constituting a vehicle body and the work of quality inspection for inspecting the fitted state of the weather strip (20) are automated, thereby contributing to work efficiency improvement and quality enhancement.

19 Claims, 9 Drawing Sheets

(58) Field of Classification Search
CPC ...... B62D 65/005; B62D 65/06; B62D 65/00;
B62D 65/02; B60Y 2304/07
See application file for complete search history.

(56) References Cited

FOREIGN PATENT DOCUMENTS

| | | | | | |
|---|---|---|---|---|---|
| JP | H08174353 | A | * | 7/1996 | |
| KR | 10-2003-0049880 | A | | 6/2003 | |
| KR | 20030049880 | A | * | 6/2003 | |
| KR | 10-2019-0033844 | A | | 4/2019 | |
| KR | 20190033844 | A | * | 4/2019 | ............ B23P 19/047 |
| WO | WO-2016089216 | A1 | * | 6/2016 | .......... B25J 15/0004 |

* cited by examiner

APPARATUS AND METHOD FOR AUTOMATIC ASSEMBLY OF WEATHER STRIP

CROSS-REFERENCE OF RELATED APPLICATIONS

This application is the U.S. National Phase under 35 U.S.C. § 371 of International Patent Application No. PCT/KR2022/020785, filed on Dec. 20, 2022, which in turn claims priority to Korean Patent Application No. 10-2022-0028479, filed on Mar. 7, 2022, the entire contents of which is incorporated herein for all purposes by this reference.

TECHNICAL FIELD

The present disclosure relates to an apparatus and a method for automatic assembly of a weather strip and, more particularly, to an apparatus and a method for automatically assembling a weather strip on a vehicle body.

BACKGROUND ART

In general, a vehicle body is equipped with doors that open and close for passengers to board and disembark, and a trunk lid or a tailgate is installed at the rear of the vehicle body depending on the vehicle model.

When a vehicle's door, trunk lid, or tailgate is closed, airtightness needs to be maintained between the vehicle body and the door, trunk lid, or tailgate to prevent foreign substances, such as rainwater, and noise from entering the vehicle cabin. For this purpose, a weather strip made of rubber materials is installed on the vehicle body.

A weather strip is installed along the edge of an opening where a door, trunk lid, or tailgate is mounted on a vehicle body. Conventional installation of weather strips is done by a worker pressing the weather strips by hand, which has the disadvantage of taking a lot of work time, low productivity, and uneven work quality. Moreover, such manual installation work causes musculoskeletal disorders and increases fatigue of workers.

The description provided above as related art of the present disclosure is just for helping understand the background of the present disclosure and should not be construed as being included in the related art known by those skilled in the art.

An example of related art in this regard is Korean Patent Application Publication No. 10-2003-0049880.

DISCLOSURE

Technical Problem

The present disclosure is intended to solve the above problems occurring in the related art. An objective of the present disclosure is to provide an apparatus and a method for automatic assembly of a weather strip, for automatically performing the work of fitting a weather strip to a vehicle body and the work of quality inspection for inspecting the fitted state of the weather strip.

Technical Solution

In order to achieve the above mentioned objectives, there is provided an apparatus for automatic assembly of a weather strip, the apparatus including: a weather strip mounting gripper configured to grip a weather strip, assemble the gripped weather strip by fitting the gripped weather strip to a chassis flange of a vehicle body, and fix a position of the weather strip during assembly; and a robot configured to be combined with the weather strip mounting gripper and operate to move the weather strip mounting gripper.

The apparatus may further include: a vision system provided on the weather strip mounting gripper to perform functions of checking a location of the weather strip mounted on a supply part, scanning a mounting location of the weather strip, and checking the quality of an assembled state of the weather strip.

The vision system may include a 2D camera and a laser vision sensor.

The weather strip mounting gripper may include: a base detachably coupled to the robot; a guide part that is provided on the base, that grips the weather strip, and that guides a path so that the weather strip follows the chassis flange when the base moves due to a movement of the robot; and an assembly part that is provided on the base and presses the weather strip to assemble the weather strip to the chassis flange.

The weather strip mounting gripper may further include: a support part that is provided on the base, that grips, together with the guide part, the weather strip, and that supports the weather strip and fixes the position of the weather strip when the assembly part assembles the weather strip to the chassis flange.

The guide part may grip the weather strip by using a first leg and a second leg respectively provided at ends thereof, and may guide the path so that the weather strip follows the chassis flange.

One of the first leg and the second leg may be located on an indoor side with respect to the chassis flange, and the other may be located on an outdoor side, and the leg located on the indoor side may be provided to be shorter in length than the leg located on the outdoor side.

The weather strip may be inserted into a space between the first leg and the second leg and be gripped, and a plurality of guide rollers and guide bearings may be coupled to the first leg and the second leg to prevent scratches from occurring on the weather strip and the chassis flange by the first leg and the second leg when the guide part is moved.

The assembly part may be configured to be capable of moving left and right along a longitudinal direction of the base and moving forward and backward in a direction perpendicular to the left-and-right movement, and at an end of the assembly part, a pressure roller may be provided to press the weather strip to fit and assemble the weather strip to the chassis flange.

The assembly part may include: a motor fixed to the base; a lead screw disposed in the longitudinal direction of the base and rotating with power of the motor; a cylinder that is coupled to the lead screw and moves to left and right of the base along the lead screw when the lead screw rotates; and a plunger that moves forward and backward when the cylinder is operated, and having the pressure roller coupled to an end thereof.

In the case where a force exceeding a set pressure is applied to the weather strip when the pressure roller presses the weather strip and assembles the weather strip to the chassis flange, the cylinder may serve as a damper so that the plunger moves backwards.

The support part may be provided with a pressing roller that contacts and supports the weather strip.

In order to achieve the above mentioned objectives, there is provided a method for automatic assembly of a weather strip, the method including: loading of gripping a weather strip located in a supply part using the weather strip mounting gripper and then loading the gripped weather strip to a working position; partial assembling of assembling a part of the weather strip by fitting the weather strip to a chassis flange by pressing the weather strip using a pressure roller provided on the weather strip mounting gripper after the weather strip is loaded in the working position; and final assembling of moving, after the partial assembling is completed, the weather strip mounting gripper along a mounting path of the chassis flange due to a movement of the robot in a state where a pressure of the pressure roller on the weather strip is maintained, and when the weather strip mounting gripper moves, assembling an entire section of the weather strip by fitting the weather strip to the chassis flange using the pressure roller.

Before the loading, preparing may be performed using a vision system provided on the weather strip mounting gripper to check a location of the weather strip mounted on the supply part and to scan a mounting location of the weather strip on a vehicle body.

When the partial assembling and the final assembling are performed, the pressure roller may press the weather strip while moving left and right and back and forth along the base of the weather strip mounting gripper to fit and assemble the weather strip to the chassis flange.

The partial assembling may include: first corner portion assembling and second corner portion assembling in which parts of the weather strip are respectively assembled to a first corner portion and to a second corner portion of the chassis flange by the pressure roller.

Assuming that the chassis flange on which the weather strip is assembled is a front side location where a front door is mounted between a front pillar and a center pillar, the first corner portion may be an upper rear corner where the center pillar and a top of the chassis flange meet, and the second corner portion may be an upper front corner where the front pillar and the top of the chassis flange meet.

Assuming that the chassis flange on which the weather strip s assembled is a rear side location where a rear door is mounted between the center pillar and a rear pillar, the first corner portion may be an upper front corner where the center pillar and a top of the chassis flange meet, and the second corner portion may be an upper rear corner where the front pillar and the top of the chassis flange meet.

When the partial assembling and the final assembling are performed, a moving speed of the robot and a moving speed of a central axis of the pressure roller may be synchronized.

The method may further include: inspecting the quality of the weather strip that has been assembled on the chassis flange by using a vision system provided on the weather strip mounting gripper after the final assembling, wherein when the vision system scans a part where the weather strip is assembled on the chassis flange, if an area occupied by the weather strip of a scanned cross-sectional area is greater than a reference value, the part may be determined as normal, and if the area occupied by the weather strip is less than the reference value, the part may be determined as defective, and for a part determined to be defective, the weather strip may be reassembled using the weather strip mounting gripper until it is determined as normal.

Advantageous Effects

According to the present disclosure, both the work of fitting a weather strip to a chassis flange forming a vehicle body and the work of quality inspection for inspecting the fitted state of the weather strip are automated, thereby shortening work time, and improving productivity and quality. Furthermore, quality-related information can be converted into data, convenience of work can be improved, and worker injuries can be prevented.

MODE FOR INVENTION

Figure 1:
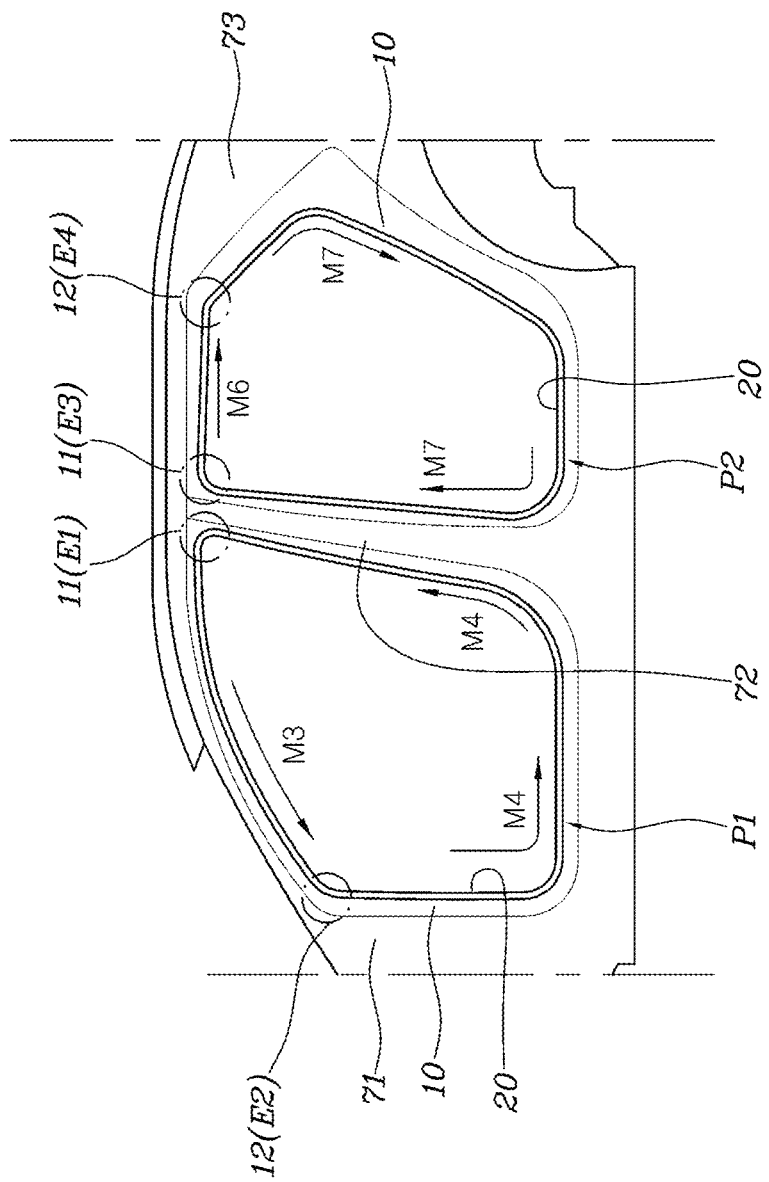
FIG. 1 is a side view of a vehicle in which a weather strip is assembled to a chassis flange by using an apparatus and a method according to the present disclosure.

Hereafter, the embodiment of the present disclosure will be described in detail with reference to the accompanying drawings and the same or similar components are given the same reference numerals regardless of the numbers of figures and are not repeatedly described.

The terms "module" and "unit" that are used for components in the following description are given or used interchangeably only for the ease of writing the specification, and do not have distinct meanings or roles in themselves.

In the following description, if it is decided that the detailed description of known technologies related to the present disclosure makes the subject matter of the embodiment described herein unclear, the detailed description is omitted.

In addition, the accompanying drawings are provided only for easy understanding of the embodiment disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween.

On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise (include)" or "have" used in this specification, specify the presence of stated features, steps, operations, components, parts, or a combination thereof, but do not preclude the presence or addition of one or more other features, numerals, steps, operations, components, parts, or a combination thereof.

In addition, the terms "unit" or "control unit" included in motor control unit (MCU), hybrid control unit (HCU), etc. are just widely used terms for naming controllers that control specific vehicle functions, and do not mean generic function units.

A controller may include a communication device that communicates with another controller or a sensor to control corresponding functions, a memory that stores an operating system or logic commands and input/output information, and one or more processors that perform determination, calculation, decision, etc. for controlling the corresponding functions.

Hereinafter, an apparatus and a method for automatic assembly of a weather strip according to preferred embodiments of the present disclosure will be described with reference to the attached drawings.

With reference to FIGS. 1 to 9, an apparatus and a method for automatic assembly of a weather strip, and series of processes according to the present disclosure will be described.

The apparatus for automatic assembly of a weather strip according to the present disclosure is a device that automatically assembles a weather strip 20 to a chassis flange 10 that constitutes a vehicle body.

Figure 2:
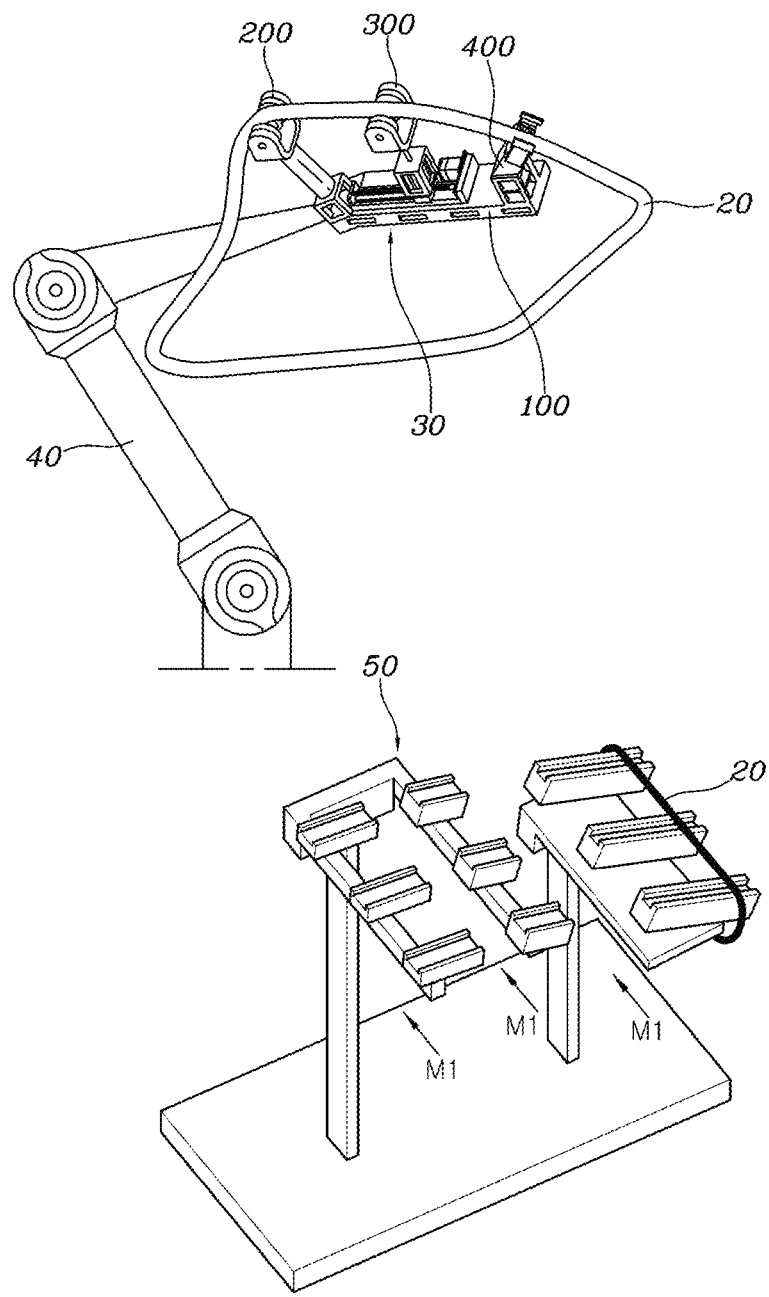
FIG. 2 is a view of the weather strip being gripped by a robot and a weather strip mounting gripper according to the present disclosure.
Figure 3:
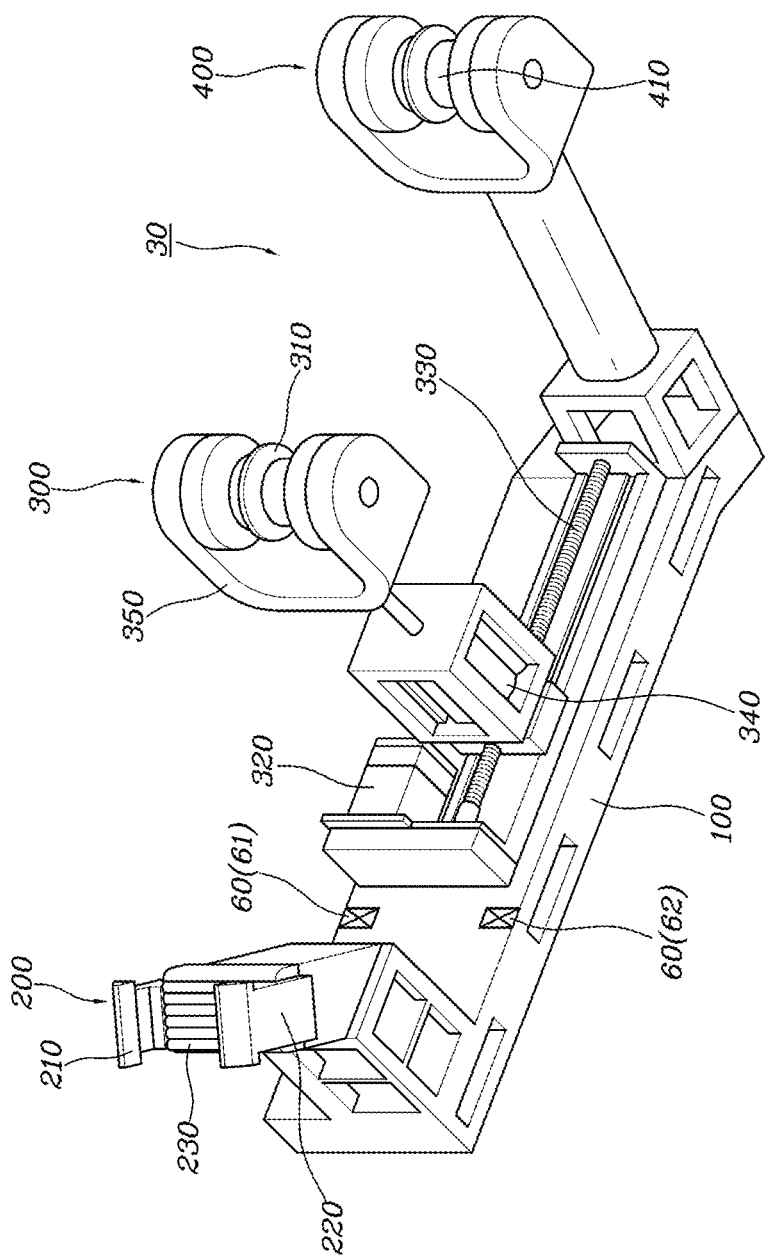
FIG. 3 is a view showing the weather strip mounting gripper according to the present disclosure.
Figure 4:
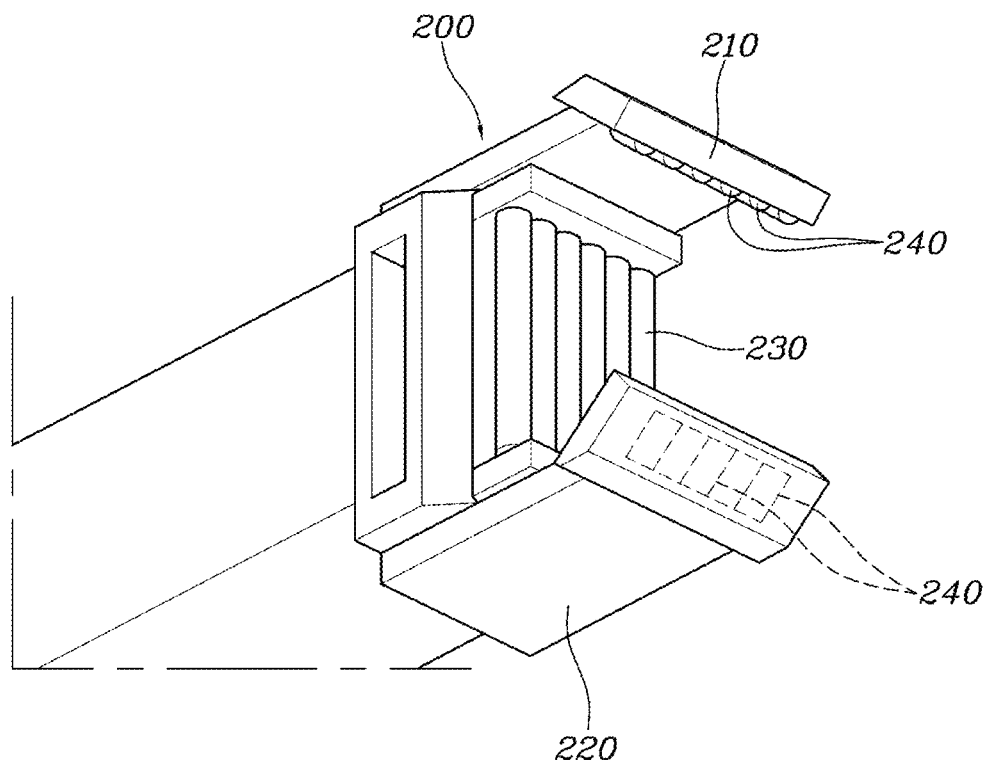
FIG. 4 is an enlarged view of a guide part shown in FIG. 3.
Figure 5:
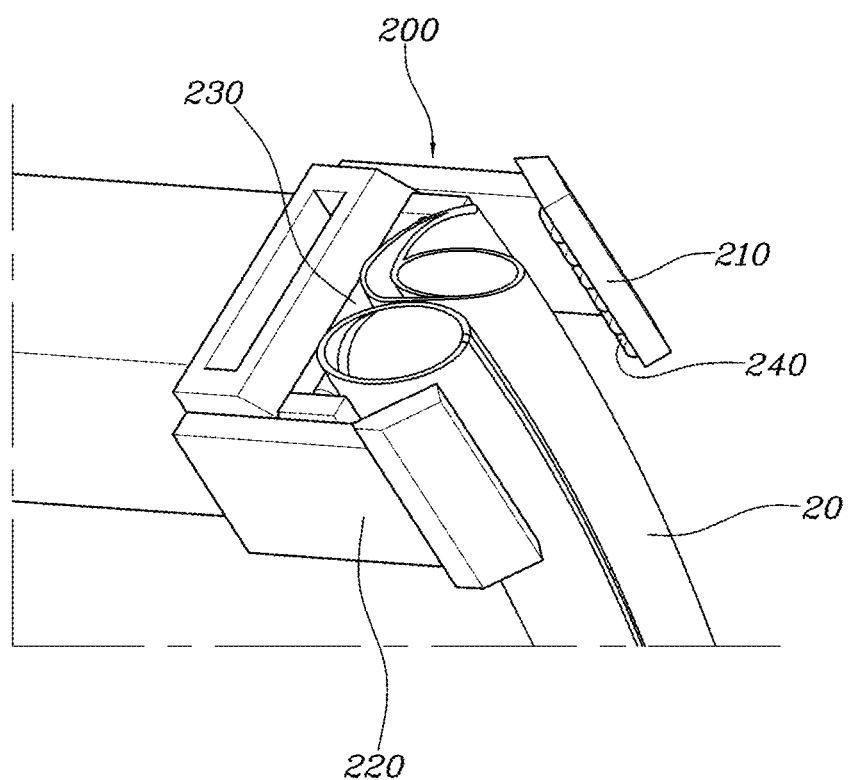
FIG. 5 is a view of a state in which the weather strip is inserted into the guide part and gripped.
Figure 6:
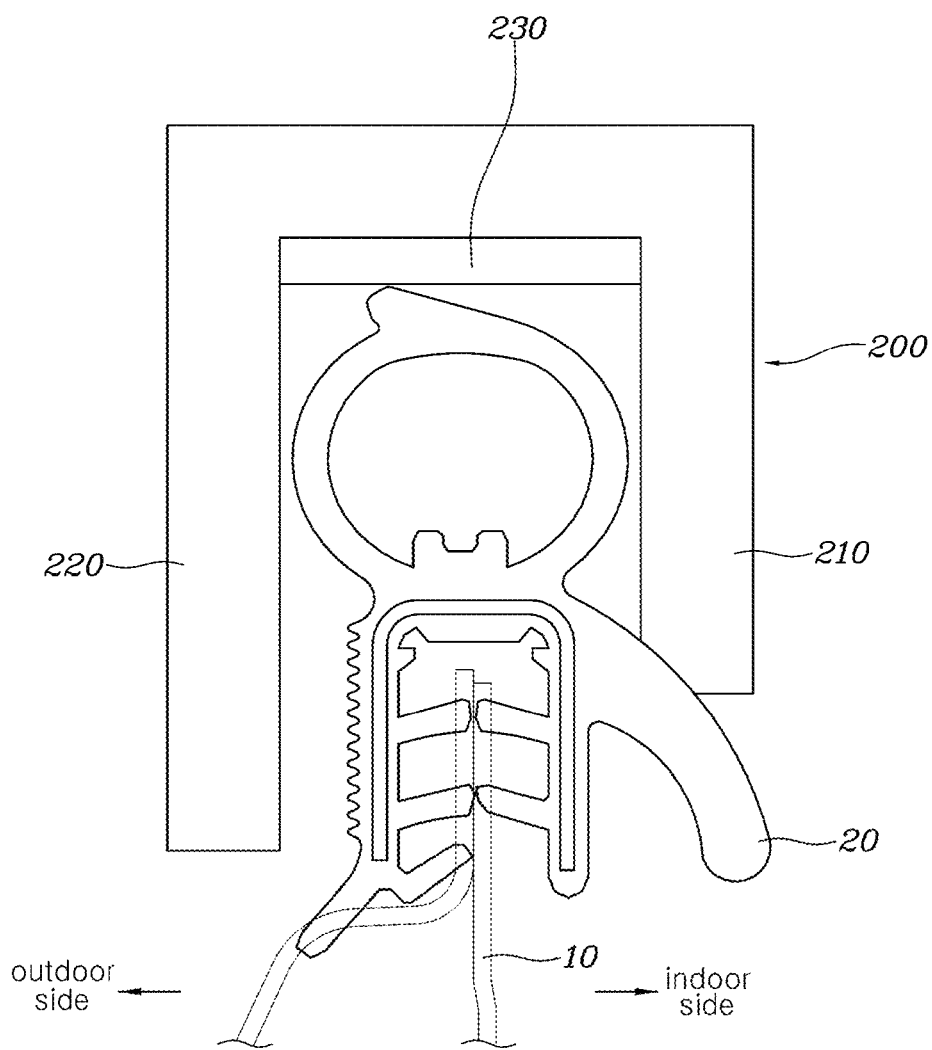
FIG. 6 is a cross-sectional view of the state shown in FIG. 5.

FIG. 1 is a side view of a vehicle in which a weather strip is assembled to a chassis flange by using an apparatus and a method according to the present disclosure, FIG. 2 is a view of the weather strip being gripped by a robot and a weather strip mounting gripper according to the present disclosure, and FIG. 3 is a view showing the weather strip mounting gripper according to the present disclosure.

The apparatus for automatic assembly of a weather strip according to the present disclosure includes: a weather strip mounting gripper 30 that grips a weather strip 20, assembles the gripped weather strip 20 by fitting the gripped weather strip 20 to a chassis flange 10 of a vehicle body, and fixes the position of the weather strip 20 during assembly; and a robot 40 that is combined with the weather strip mounting gripper 30 and operates to move the weather strip mounting gripper 30.

The weather strip mounting gripper 30 serves to grip the weather strip 20 mounted on a supply part 50 and assemble the weather strip 20 by fitting the weather strip 20 to the chassis flange 10, and is combined with the robot 40 in a separable structure.

Arrow M1 in FIG. 2 is the direction of the entry path of the weather strip mounting gripper 30. The weather strip mounting gripper 30 moves along arrow M1 and grips the weather strip 20 mounted on the supply part 50.

The robot 40 may be a multi-joint robot arm with six or more axes that has a force control function for applying a certain amount of force in any direction and that can detect the location of the tool center point (TCP).

In addition, the apparatus for automatic assembly of a weather strip according to the present disclosure further includes: a vision system 60 provided on the weather strip mounting gripper 30 to perform the functions of checking the location of the weather strip 20 mounted on the supply part 50, scanning the mounting location of the weather strip 20, and checking the quality of the assembled state of the weather strip 20.

The vision system 60 may be a 2D (two dimensions) camera 61 and a laser vision sensor 62 or a 3D (three dimensions) vision sensor.

The vision system 60 may check the location of the weather strip 20 in the supply part 50, scan the mounting location on the chassis flange 10 where the weather strip 20 is assembled on the vehicle body, and check the assembled state of the weather strip 20 for quality inspection of the assembled state.

If necessary, the vision system 60 may be installed on the robot 40 rather than on the weather strip mounting gripper 30.

The weather strip 20 mounted on the supply part 50 is gripped by the weather strip mounting gripper 30, which moves under the operation of the robot 40, and is then moved to a work site and loaded for assembly with the chassis flange 10.

The weather strip mounting gripper 30 according to the present disclosure includes: a base 100 detachably coupled to the robot 40; a guide part 200 that is provided on the base 100, that grips the weather strip 20, and that guides the path so that the weather strip 20 may follow the chassis flange 10 when the base 100 moves due to the movement of the robot 40; an assembly part 300 that is provided on the base 100 and presses the weather strip 20 to assemble the weather strip 20 to the chassis flange 10; and a support part 400 that is provided on the base 100, that grips the weather strip 20 together with the guide part 200, and that supports the weather strip 20 and fixes the position of the weather strip 20 when the assembly part 300 assembles the weather strip 20 to the chassis flange 10.

The base 100 may be composed of a straight hexahedral plate or a bracket, and the guide part 200, the assembly part 300, and the support part 400 are provided on one surface of the base 100 to be spaced apart along the longitudinal direction of the base 100.

The guide part 200 is provided with a first leg 210 and a second leg 220 facing each other at the end thereof. The guide part 200 grips the weather strip 20 using the first leg 210 and the second leg 220, and guides the path so that the weather strip 20 may follow the chassis flange 10.

The first leg 210 and the second leg 220 are configured in an unsealed state with the ends thereof spaced apart from each other to avoid interference with the chassis flange 10. Reflecting the shape of the weather strip 20, either the first leg 210 or the second leg 220 has a relatively short length.

That is, one of the first leg 210 and the second leg 220 is located on the indoor side with respect to the chassis flange 10, and the other is located on the outdoor side, and the leg located on the indoor side is formed to be shorter in length than the leg located on the outdoor side.

In the present disclosure, as an example, the first leg 210 is shown to be located on the indoor side and has a shorter length than the second leg 220. However, conversely, the second leg 220 may be located on the indoor side and has a shorter length than the first leg 210.

The weather strip 20 is inserted into the space between the first leg 210 and the second leg 220 and is gripped. A plurality of guide rollers 230 and guide bearings 240 are coupled to the first leg 210 and the second leg 220 to prevent scratches from occurring on the weather strip 20 and the chassis flange 10 by the first leg 210 and the second leg 220 when the guide part 200 is moved.

The guide rollers 230 are disposed between the first leg 210 and the second leg 220 on the inside of the first leg 210 and the second leg 220, and due to the guide rollers 230, scratches on the weather strip 20 may be prevented.

The guide bearings 240 are provided on the inner surface of the end of the first leg 210 and the inner surface of the end of the second leg 220, and due to the guide bearings 240, scratches on the chassis flange 10 may be prevented.

The assembly part 300 is configured to be capable of moving left and right along the longitudinal direction of the base 100 and moving forward and backward in a direction perpendicular to the left-and-right movement. At the end of the assembly part 300, a pressure roller 310 is rotatably provided to press the weather strip 20 to fit and assemble the weather strip 20 to the chassis flange 10.

That is, the assembly part 300 includes: a motor 320 fixed to the base 100; a lead screw 330 disposed in the longitudinal direction of the base 100 and rotating with the power of the motor 320; a cylinder 340 that is coupled to the lead screw 330 and moves to the left and right of the base 100 along the lead screw 330 when the lead screw 330 rotates; and a plunger 350 that moves forward and backward when the cylinder 340 is operated, and having the pressure roller 310 rotatably coupled to the end thereof.

The motor 320 is a servo motor, the cylinder 340 is a pneumatic cylinder, and the end of the plunger 350 is formed in a clevis shape so that the pressure roller 310 is rotatably coupled thereto.

The pressure roller 310 moves to the left and right of the base 100 along the lead screw 330 when the motor 320 operates, and moves forward and backward when the cylinder 340 operates. When assembling the weather strip 20 by fitting the weather strip 20 to the chassis flange 10 using the pressure roller 310, the pressure roller 310 moves left and right and forward and backward to assemble the weather strip 20.

In the case where a force exceeding the set pressure is applied to the weather strip 20 when the pressure roller 310 presses the weather strip 20 and assembles the weather strip 20 to the chassis flange 10, the cylinder 340 serves as a damper so that the plunger 350 may move backwards. As a result, smooth movement of the weather strip mounting gripper 30 and assembly of the weather strip 20 using the pressure roller 310 are possible.

The support part 400 is provided with a pressing roller 410 that contacts and supports the weather strip 20.

When the pressure roller 310 moves forward to fit the weather strip 20 to the chassis flange 10, the pressing roller 410, together with the first leg 210 and the second leg 220, touches the chassis flange 10 and serves to support the weather strip 20 so that the weather strip 20 does not shake.

When the pressure roller 310 presses the weather strip 20 to fit the weather strip 20 to the corner portion of the chassis flange 10 to assemble the weather strip 20, the pressing roller 410 needs to be able to bend the weather strip 20 by pressing the weather strip 20 for smooth assembly of the weather strip 20. For this purpose, the pressing roller 410 may be configured to maintain a predetermined angle with the first leg 210 and the second leg 220 of the guide part 200, and may be configured to maintain a predetermined angle with the pressure roller 310 of the assembly part 300.

If necessary, the pressing roller 410 may be designed to have no angle with the first leg 210, the second leg 220, and the pressure roller 310.

Figure 7:
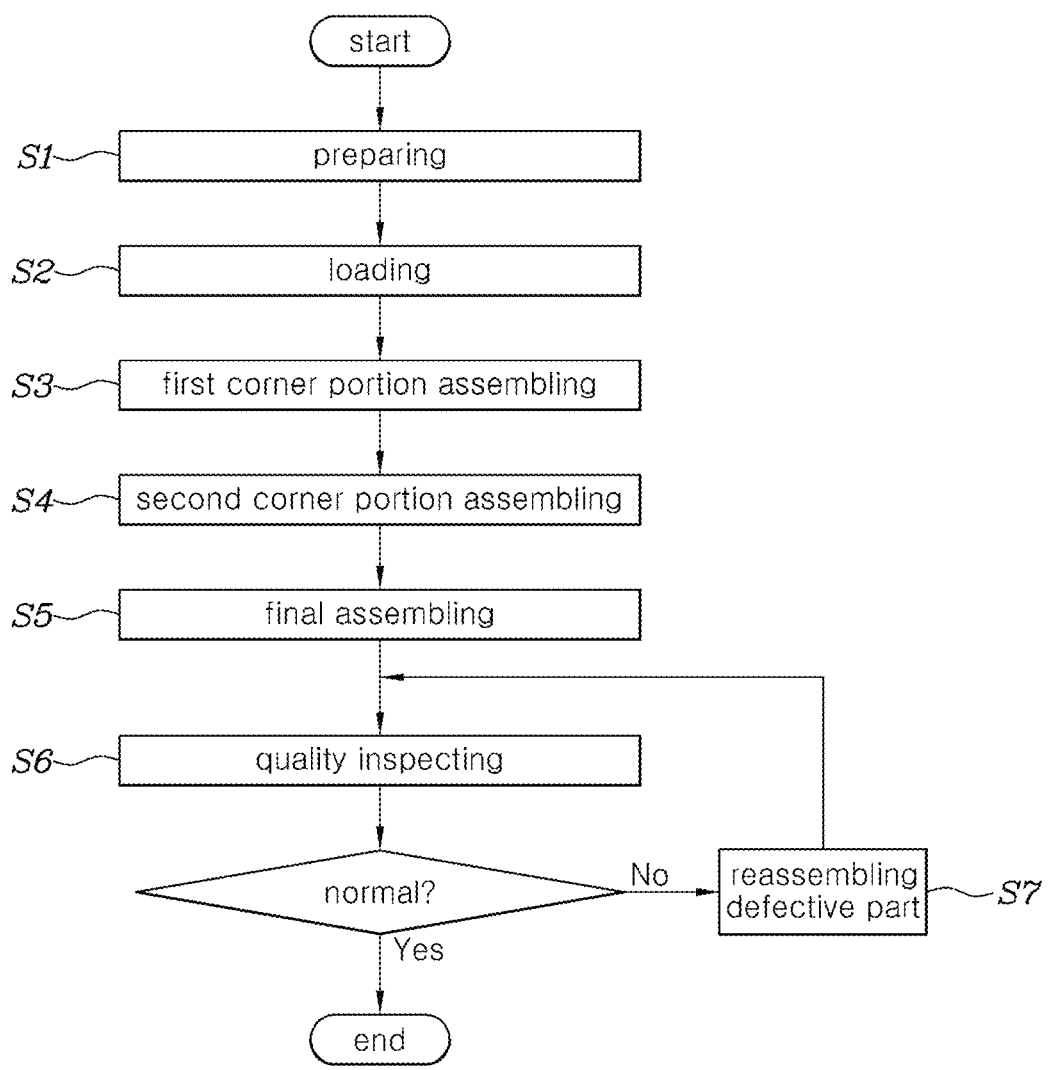
FIG. 7 is a schematic flowchart showing the method for automatic assembly of a weather strip according to the present disclosure.

FIG. 7 is a schematic flowchart showing the method for automatic assembly of a weather strip according to the present disclosure.

A method for automatic assembly of a weather strip according to the present disclosure includes: preparing (step S1), using the vision system 60 provided on the weather strip mounting gripper 30, of checking the location of the weather strip 20 mounted on the supply part 50, and of scanning the chassis flange 10 corresponding to the mounting location of the weather strip 20 on the vehicle body; loading (step S2) of gripping the weather strip 20 located in the supply part 50 using the weather strip mounting gripper 30 and then loading the gripped weather strip 20 to a working position; partial assembling of assembling a part of the weather strip 20 by fitting the weather strip 20 to the chassis flange 10 by pressing the weather strip 20 using the pressure roller 310 provided on the weather strip mounting gripper 30 after the weather strip 20 is loaded in the working position; and final assembling (step S5) of moving, after the partial assembling is completed, the weather strip mounting gripper 30 along the mounting path of the chassis flange 10 due to the movement of the robot 40 in a state where the pressure of the pressure roller 310 on the weather strip 20 is maintained, and when the weather strip mounting gripper 30 moves, assembling the entire section of the weather strip 20 by fitting the weather strip 20 to the chassis flange 10 using the pressure roller 310.

The location of the weather strip 20 mounted on the supply part 50 is checked using the vision system 60 before assembling the weather strip 20 to the chassis flange 10, and the chassis flange 10 corresponding to the mounting location of the weather strip 20 on the vehicle body is scanned. (step S1)

Once scanning using the vision system 60 is completed, the weather strip 20 located in the supply part 50 is gripped by the weather strip mounting gripper 30 due to the movement of the robot 40, and then the gripped weather strip 20 is loaded into the working position. (step S2)

After the weather strip 20 is loaded into the working position, partial assembling is performed in which the pressure roller 310 presses the weather strip 20 due to the movement of the weather strip mounting gripper 30 by the robot 40 and the movement of the pressure roller 310 by the operation of the motor 320 and the cylinder 340 and fits a part of the weather strip 20 to the chassis flange 10.

When partial assembling is performed, the pressure roller 310 presses the weather strip 20 while moving left and right and back and forth along the base 100 of the weather strip mounting gripper 30 to fit and assemble the weather strip 20 to the chassis flange 10.

Partial assembling step according to the present disclosure includes: first corner portion assembling (step S3) and second corner portion assembling (step S4) in which a part of the weather strip 20 is assembled to a first corner portion 11 and to a second corner portion 12 of the chassis flange 10 by the pressure roller 310.

Referring to FIG. 1, assuming that the chassis flange 10 on which the weather strip 20 is assembled is a front side location P1 where a front door is mounted between a front pillar 71 and a center pillar 72, the first corner portion 11 is an upper rear corner E1 where the center pillar 72 and the top of the chassis flange 10 meet, and the second corner portion 12 is an upper front corner E2 where the front pillar 71 and the top of the chassis flange 10 meet.

Figure 8:
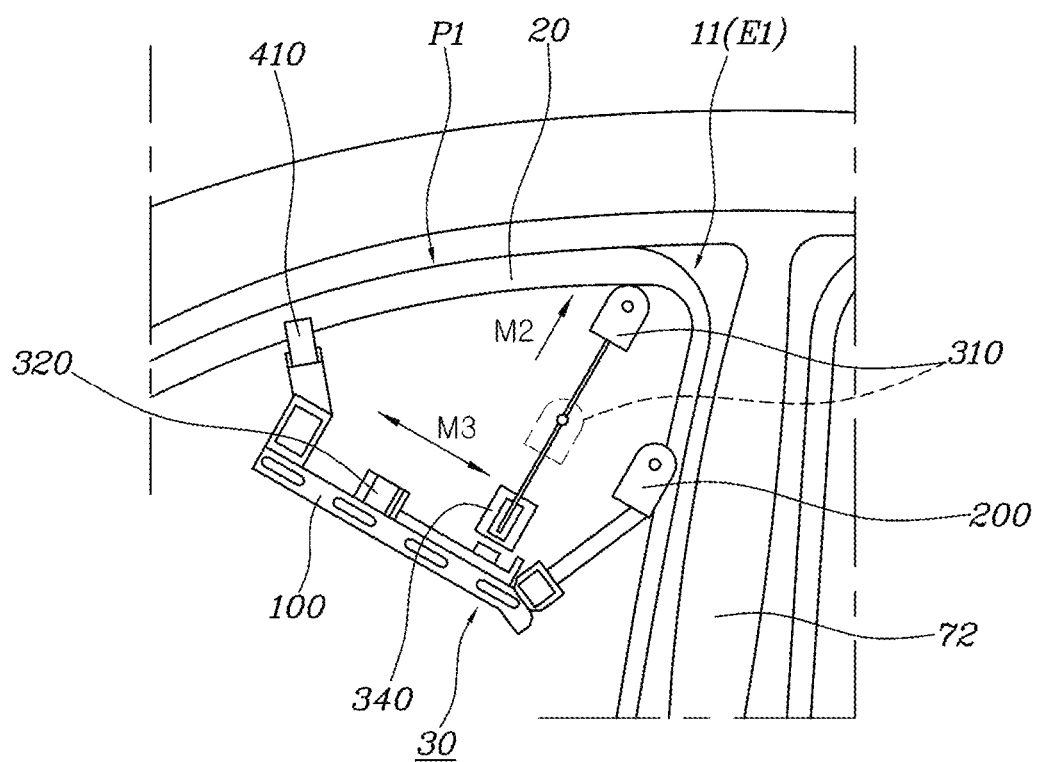
FIGS. 8 to 9 are views showing the automatic assembly process of the weather strip.

When the weather strip 20 gripped from the supply part 50 is loaded to the front side location P1, the weather strip mounting gripper 30 is located at the upper rear corner E1 corresponding to the first corner portion 11 as shown in FIG. 8.

In a state where the weather strip mounting gripper 30 is located at the upper rear corner E1, due to the operation of the cylinder 34, the pressure roller 310 moves forward M2 and a portion of the weather strip 20 is fitted and assembled into the chassis flange 10 at the upper rear corner E1, and due to the operation of the motor 320, the pressure roller 310 moves in the direction of arrow M3 along the lead screw 330, and a portion of the weather strip 20 located on the left side of the upper rear corner E1 is fitted to the chassis flange 10 and assembled, and as a result, the first corner portion assembling (step S3) is completed.

Once the first corner portion assembling (step S3) is completed, the weather strip mounting gripper 30 moves to the upper front corner E2 corresponding to the second corner portion 12 due to the operation of the robot 40, and at the upper front corner E2, with the same operation of the pressure roller 310 as described above, a portion of the weather strip 20 is fitted to the chassis flange 10 at the upper front corner E2, and as a result, the second corner portion assembling (step S4) is completed.

As previously described, after the weather strip 20 is loaded to the front side location P1 between the front pillar 71 and the center pillar 72, and the first corner portion assembling (step S3) and the second corner portion assembling (step S4) are completed, due to the operation of the robot 40, the weather strip mounting gripper 30 sequentially moves counterclockwise as shown by arrow M4 in FIG. 1.

When the weather strip mounting gripper 30 moves counterclockwise (arrow M4), the pressure roller 310 presses the remaining portion of the weather strip 20, which is the unassembled portion, and fits the remaining portion of the weather strip 20 to the chassis flange 10 to perform the final assembling (step S5). As a result, the entire section of the weather strip 20 is fitted to the chassis flange 10 and assembly is completed.

In addition, referring to FIG. 1, assuming that the chassis flange 10 on which the weather strip 20 is assembled is a rear side location P2 where a rear door is mounted between the center pillar 72 and a rear pillar 73, the first corner portion 11 is an upper front corner E3 where the center pillar 72 and the top of the chassis flange 10 meet, and the second corner portion 12 is an upper rear corner E4 where the front pillar 71 and the top of the chassis flange 10 meet.

Figure 9:
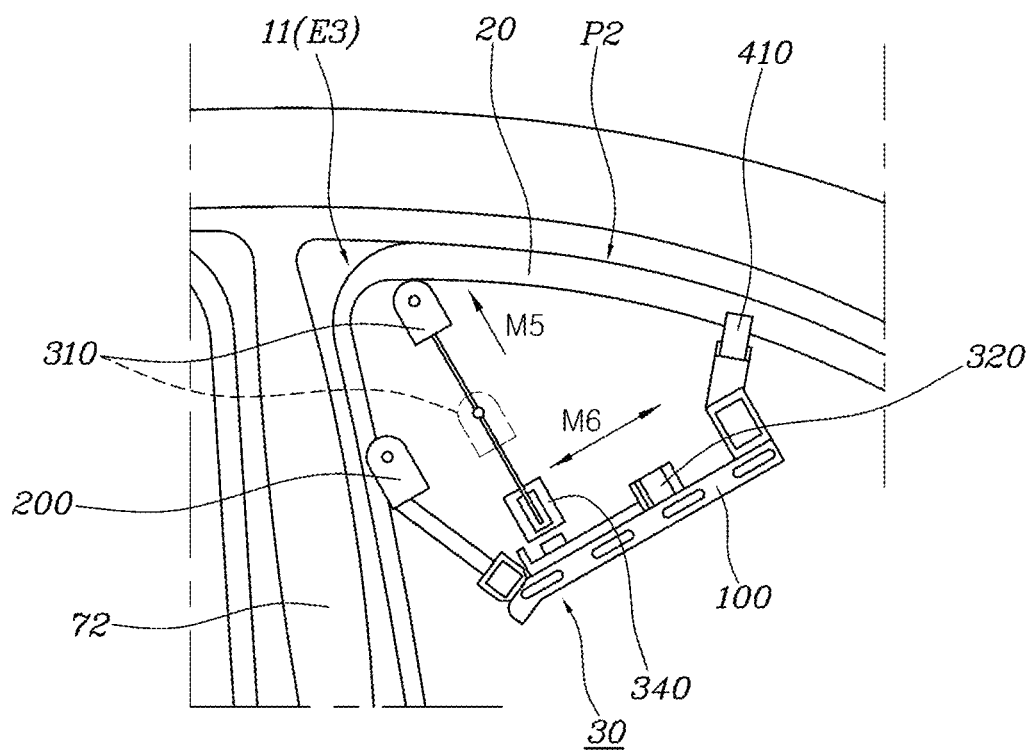

When the weather strip 20 gripped from the supply part 50 is loaded to the rear side location P2, the weather strip mounting gripper 30 is located at the upper front corner E3 corresponding to the first corner portion 11 as shown in FIG. 9.

In a state where the weather strip mounting gripper 30 is located at the upper front corner E3, due to the operation of the cylinder 34, the pressure roller 310 moves forward M5 and a portion of the weather strip 20 is fitted and assembled into the chassis flange 10 at the upper front corner E3, and due to the operation of the motor 320, the pressure roller 310 moves in the direction of arrow M6 along the lead screw 330, and a portion of the weather strip 20 located on the right side of the upper front corner E3 is fitted to the chassis flange 10 and assembled, and as a result, the first corner portion assembling (step S3) is completed.

Once the first corner portion assembling (step S3) is completed, the weather strip mounting gripper 30 moves to the upper rear corner E4 corresponding to the second corner portion 12 due to the operation of the robot 40, and at the upper rear corner E4, with the same operation of the pressure roller 310 as described above, a portion of the weather strip 20 is fitted to the chassis flange 10 at the upper rear corner E4, and as a result, the second corner portion assembling (step S4) is completed.

As previously described, after the weather strip 20 is loaded to the rear side location P2 between the center pillar 72 and the rear pillar 73, and the first corner portion assembling (step S3) and the second corner portion assembling (step S4) are completed, due to the operation of the robot 40, the weather strip mounting gripper 30 sequentially moves clockwise as shown by arrow M7 in FIG. 1.

When the weather strip mounting gripper 30 moves clockwise (arrow M7), the pressure roller 310 presses the remaining portion of the weather strip 20, which is the unassembled portion, and fits the remaining portion of the weather strip 20 to the chassis flange 10 to perform the final assembling (step S5). As a result, the entire section of the weather strip 20 is fitted to the chassis flange 10 and assembly is completed.

Meanwhile, when performing the partial assembling, that is the first corner portion assembling (step S3) and the second corner portion assembling (step S4)), and the final assembling (step S5) according to the present disclosure, the movement speed of the robot 40 and the movement speed of the central axis of the pressure roller 310 are synchronized, and due to this, it is possible to minimize both quality problems and installation quality problems of the weather strip 20.

When pressing the weather strip 20 using the pressure roller 310 according to the present disclosure, the movement speed of the robot 40 and the movement speed of the central axis of the pressure roller 310 are synchronized to the same level in order to improve installation quality.

When the movement speed of the robot 40 is slower than the movement speed of the central axis of the pressure roller 310, the front part of the pressure roller 310 in the moving direction is compressed, and the rear part is subjected to increasing force (tensile force), which causes problems with the quality of components and the phenomenon of corner pushing during installation.

Thus, by controlling the rotation speed of the pressure roller 310 with a servo motor to synchronize the movement speed of the robot 40 and the movement speed of the central axis of the pressure roller 310 to be the same, both quality problems and installation quality problems may be minimized when the weather strip 20 is installed.

The rotational speed of the roller=the movement speed of the robot×extension length of weather strip/compression length of weather strip×weather strip friction/weather strip slip×weather strip tensile coefficient. In this case, the ratio of friction and slip of the weather strip, and the ratio of the extension length and compression length of the weather strip may be calculated through experiment.

The method for automatic assembly of a weather strip according to the present disclosure further includes: inspecting (S6) the quality of the weather strip 20 that has been assembled on the chassis flange 10 by using the vision system 60 provided on the weather strip mounting gripper 30 after the final assembling (step S5).

When scanning the part where the weather strip 20 is assembled on the chassis flange 10 using the vision system 60, if the area occupied by the weather strip 20 of the scanned cross-sectional area is greater than a reference value (for example, the area occupied by the weather strip 20 is more than 60% of the cross-sectional area of the chassis flange 10), it may be determined as normal, and if the area occupied by the weather strip 20 is less than the reference value (60%), it may be determined as defective.

In the part determined to be defective, a large empty space is created between the chassis flange 10 and the weather strip 20, and the defective state may be determined as the vision system 60 scans the empty space.

In the embodiment according to the present disclosure, correcting (S7) of reassembling the weather strip 20 using the weather strip mounting gripper 30 may be additionally performed on the part determined to be defective until it is determined as normal.

As described above, according to the apparatus and the method for automatic assembly of a weather strip according to the present disclosure, both the work of fitting the weather strip 20 to the chassis flange 10 forming a vehicle body and the work of quality inspection for inspecting the fitted state of the weather strip 20 are automated, thereby shortening work time, and improving productivity and quality. Furthermore, quality-related information may be converted into data, convenience of work may be improved, and worker injuries may be prevented.

Although the present disclosure was provided above in relation to specific embodiments shown in the drawings, it is apparent to those skilled in the art that the present disclosure may be changed and modified in various ways without departing from the scope of the present disclosure, which is provided in the following claims.

[Description of Numerals]

10-chassis flange
11-first corner portion
12-second corner portion
20- weather strip
30- weather strip mounting gripper
40-robot
50-supply part
60-vision system
61-2D camera
62-laser vision sensor
71-front pillar
72-center pillar
73-rear pillar
100-base
200-guide part
210-first leg
220-second leg
230-guide roller
240-guide bearing
300-assembly part
310-pressure roller
320-motor
330-lead screw
340-cylinder
350-plunger
400-support part
410-pressing roller

The invention claimed is:

1. An apparatus for automatic assembly of a weather strip, the apparatus comprising:
a weather strip mounting gripper configured to grip a weather strip, assemble the gripped weather strip by fitting the gripped weather strip to a chassis flange of a vehicle body, and fix a position of the weather strip during assembly; and
a robot configured to be combined with the weather strip mounting gripper and operate to move the weather strip mounting gripper,
wherein the weather strip mounting gripper comprises:
a base detachably coupled to the robot;
a guide part that is provided on the base, that grips the weather strip, and that guides a path so that the weather strip follows the chassis flange when the base moves due to a movement of the robot; and
an assembly part that is provided on the base, configured to be capable of moving left and right along a longitudinal direction of the base and moving forward and backward in a direction perpendicular to the left-and-right movement and presses the weather strip to assemble the weather strip to the chassis flange.

2. The apparatus of claim 1, further comprising:
a vision system provided on the weather strip mounting gripper to perform functions of checking a location of the weather strip mounted on a supply part, scanning a mounting location of the weather strip, and checking a quality of an assembled state of the weather strip.

3. The apparatus of claim 2, wherein the vision system comprises a 2D camera and a laser vision sensor.

4. The apparatus of claim 1, wherein the weather strip mounting gripper further comprises:
a support part that is provided on the base, that grips, together with the guide part, the weather strip, and that supports the weather strip and fixes the position of the weather strip when the assembly part assembles the weather strip to the chassis flange.

5. The apparatus of claim 1, wherein the guide part grips the weather strip by using a first leg and a second leg respectively provided at ends thereof, and guides the path so that the weather strip follows the chassis flange.

6. The apparatus of claim 5, wherein one of the first leg and the second leg is located on an indoor side with respect to the chassis flange, and the other is located on an outdoor side, and the leg located on the indoor side is provided to be shorter in length than the leg located on the outdoor side.

7. The apparatus of claim 5, wherein the weather strip is inserted into a space between the first leg and the second leg and is gripped, and a plurality of guide rollers and guide bearings are coupled to the first leg and the second leg to prevent scratches from occurring on the weather strip and the chassis flange by the first leg and the second leg when the guide part is moved.

8. The apparatus of claim 1, wherein at an end of the assembly part, a pressure roller is provided to press the weather strip to fit and assemble the weather strip to the chassis flange.

9. The apparatus of claim 8, wherein the assembly part comprises:
a motor fixed to the base;
a lead screw disposed in the longitudinal direction of the base and rotating with power of the motor;
a cylinder that is coupled to the lead screw and moves to left and right of the base along the lead screw when the lead screw rotates; and
a plunger that moves forward and backward when the cylinder is operated, and having the pressure roller coupled to an end thereof.

10. The apparatus of claim 9, wherein in the case where a force exceeding a set pressure is applied to the weather strip when the pressure roller presses the weather strip and assembles the weather strip to the chassis flange, the cylinder serves as a damper so that the plunger moves backwards.

11. The apparatus of claim 4, wherein the support part is provided with a pressing roller that contacts and supports the weather strip.

12. A method for automatic assembly of the weather strip by using the apparatus of claim 1, the method comprising:

loading of gripping the weather strip located in a supply part using the weather strip mounting gripper and then loading the gripped weather strip to a working position;

partial assembling of assembling a part of the weather strip by fitting the weather strip to the chassis flange by pressing the weather strip using a pressure roller provided on the weather strip mounting gripper after the weather strip is loaded in the working position; and final assembling of moving, after the partial assembling is completed, the weather strip mounting gripper along a mounting path of the chassis flange due to a movement of the robot in a state where a pressure of the pressure roller on the weather strip is maintained, and when the weather strip mounting gripper moves, assembling an entire section of the weather strip by fitting the weather strip to the chassis flange using the pressure roller.

13. The method of claim 12, wherein before the loading, preparing is performed using a vision system provided on the weather strip mounting gripper to check a location of the weather strip mounted on the supply part and to scan a mounting location of the weather strip on a vehicle body.

14. The method of claim 12, wherein when the partial assembling and the final assembling are performed, the pressure roller presses the weather strip while moving left and right and back and forth along the base of the weather strip mounting gripper to fit and assemble the weather strip to the chassis flange.

15. The method of claim 12, wherein the partial assembling comprises:
first corner portion assembling and second corner portion assembling in which parts of the weather strip are respectively assembled to a first corner portion and to a second corner portion of the chassis flange by the pressure roller.

16. The method of claim 15, wherein assuming that the chassis flange on which the weather strip is assembled is a front side location where a front door is mounted between a front pillar and a center pillar, the first corner portion is an upper rear corner where the center pillar and a top of the chassis flange meet, and the second corner portion is an upper front corner where the front pillar and the top of the chassis flange meet.

17. The method of claim 15, wherein assuming that the chassis flange on which the weather strip s assembled is a rear side location where a rear door is mounted between the center pillar and a rear pillar, the first corner portion is an upper front corner where the center pillar and a top of the chassis flange meet, and the second corner portion is an upper rear corner where the rear pillar and the top of the chassis flange meet.

18. The method of claim 12, wherein when the partial assembling and the final assembling are performed, a moving speed of the robot and a moving speed of a central axis of the pressure roller are synchronized.

19. The method of claim 12, further comprising:
inspecting a quality of the weather strip that has been assembled on the chassis flange by using a vision system provided on the weather strip mounting gripper after the final assembling,
wherein when the vision system scans a part where the weather strip is assembled on the chassis flange, if an area occupied by the weather strip of a scanned cross-sectional area is greater than a reference value, the part is determined as normal, and if the area occupied by the weather strip is less than the reference value, the part is determined as defective, and
for a part determined to be defective, the weather strip is reassembled using the weather strip mounting gripper until it is determined as normal.

* * * * *